Oct. 30, 1962     H. D. EPSTEIN     3,061,699
THERMOSTATIC SWITCH
Filed March 16, 1959
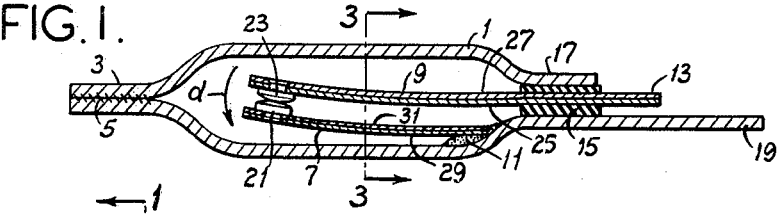
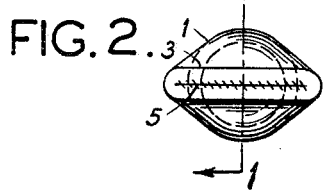 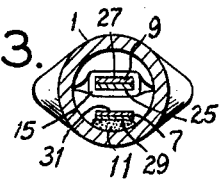 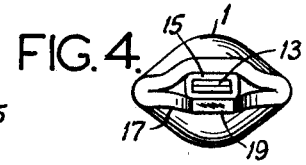
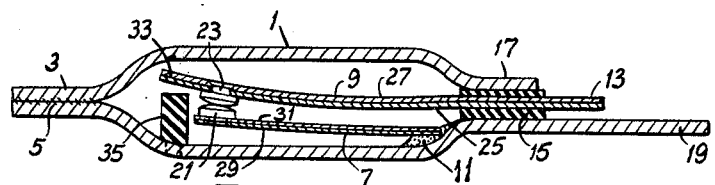
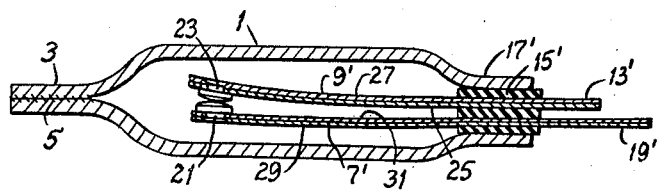
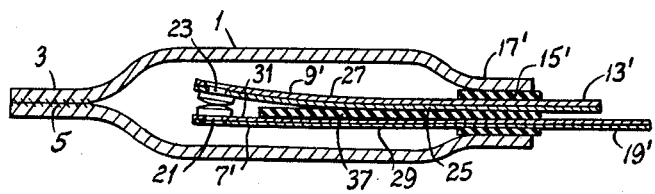
Henry David Epstein,
Inventor.
Koenig and Pope,
Attorneys.

3,061,699
Patented Oct. 30, 1962

3,061,699
THERMOSTATIC SWITCH
Henry David Epstein, Cambridge, Mass., assignor to Texas Instruments Incorporated, Dallas, Tex., a corporation of Delaware
Filed Mar. 16, 1959, Ser. No. 799,681
11 Claims. (Cl. 200—113)

This invention relates to thermostatic switches, and more particularly to such switches for motor protection and the like.

Among the several objects of the invention may be noted the provision of an improved thermostatic switch adapted to function as a protective device to be placed in heat-exchange relation with circuit elements, such as the windings of a motor to be protected; the provision of such a thermostatic switch which, upon relatively rapid increase in temperature, will trip and open a circuit at a lower temperature than that at which it will trip upon a relatively slow increase in temperature; the provision of a thermostat of the class described adapted to minimize cycling rates in response to rapid temperature rise; and the provision of a thermostatic switch of this class which is simple in construction and compact in form, adapted for convenient placement near circuit elements to be controlled or protected. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a much enlarged axial section showing one form of the invention;

FIG. 2 is a left-end view of FIG. 1;

FIG. 3 is a cross section taken on line 3—3 of FIG. 1;

FIG. 4 is a right-end elevation of FIG. 1;

FIG. 5 is a view similar to FIG. 1, showing a modification;

FIG. 6 is a view similar to FIG. 1, showing another form of the invention; and,

FIG. 7 is a view similar to FIG. 6, showing another alternative form of the invention.

Corresponding reference characters indicate corresponding parts throughout the several views of the drawings.

There are various electrical circuits in which load-induced temperatures are applied to thermostatic switches in order to open the circuits, so as to prevent further temperature rise. Examples are motor circuits, electrically heated cooking utensils and the like. These have in common the requirement that measures should be more rapidly taken to counteract rapid temperature rises than slower temperature rises, in order to prevent excessive temperature over-swing. Thus in the case of a motor circuit, rapidly rising temperatures should be counteracted as rapidly as possible; for example, temperature rise induced by large currents which flow under locked rotor conditions. In the case of a control of the heater elements of a cooking utensil, the temperature rise may not depend upon current variations but upon variable contents of the vessel. The thermostatic switch of the present invention is small and adapted to be placed in closed heat-exchange relationship with the circuit elements to be protected, as for example, in or near motor windings, heater elements and the like. For the purpose of describing the invention, its application as a motor protector will be discussed.

Referring now more particularly to FIGS. 1–4, there is shown at numeral 1 a tubular, preferably metal, casing, pinched off as shown at 3 and sealed as shown at 5, to provide a sealed end closure. Within the casing 1 are located two bimetallic strips or blades 7 and 9. Strip 7 is anchored at one end to the casing 1 by means of a suitable weldment, solder or the like 11. The other strip 9 extends from the casing, as shown at 13, being at its point of exit surrounded by a sleeve of insulating material 15 around which the casing is tightly crimped, as shown at 17. This arrangement holds the strip 9 in position adjacent the thermostatic strip 7. A portion of the casing forms an extension, as shown at 19. The extensions 13 and 19 form switch terminals for connection with line terminals of the electric line to be controlled, as by soldering or the like. At their inner free ends, the strips 7 and 9 are provided with movable contacts 21 and 23, respectively. The arrangement is such that these springingly engage under comparatively low temperature conditions of the strips 7 and 9.

Each of the strips 7 and 9 is composed of bonded components having different coefficients of thermal expansion. Thus strip 9 has a component 27 of relatively high coefficient of expansion which faces the casing 1, and a component 25 of relatively low coefficient of expansion which faces strip 7. Strip 7 has a component 31 of relatively high coefficient of expansion which faces strip 9, and a component 29 of relatively low coefficient of expansion which faces the casing 1. Strip 7 is constructed so as to have a substantially greater electrical resistance than strip 9, which may be accomplished by means known to the art, such as the employment of relatively high-resistance materials and/or the employment of a relatively small cross section presented to current flow. Strip 9 is constructed to be somewhat less active than strip 7, for example, by making it thicker than strip 7. The term active as applied to thermostatic strips refers to the amounts of their movements in response to a given temperature change. The greater the movement for a given temperature change, the more active a strip is said to be.

The composite strips 7 and 9 are mounted so that the contacts 21 and 23 springingly engage, with some pressure between them under comparatively low temperature conditions. The purpose of this is to delay recession of the contact 21 on the more active strip 7 from the contact 23 on the less active strip 9 upon temperature rise.

Operation of the form of the invention shown in FIGS. 1–4 is as follows:

Assume that the device is set to trip in response to a certain temperature on a slow rate of temperature rise. Then both strips 7 and 9 will heat at nearly the same rate because of the heat-exchange relation between them, both with regard to radiation therebetween, and between them and the housing, and conduction through the contacts 21 and 23. Both strips will deflect in the direction shown by the dart d but strip 7, being more active, will deflect more rapidly and at a certain temperature will cause tripping by withdrawal of the contact 21 from the contact 23. On the other hand, there may occur a fast temperature rise, such as in response to large current flowing under locked rotor conditions of a motor. The increased current will cause a comparatively rapid generation of heat in the comparatively high-resistance strip 7. The greater amount of heat thus generated requires more time for transfer from strip 7 to strip 9. Hence strip 7 will deflect more rapidly than strip 9. This causes more rapid separation between the contacts 21 and 23 to open the circuit at a temperature which is substantially lower than the opening temperature effected upon slow rates of temperature rise. This action may be referred to as a temperature-anticipating action in response to rapid current rise and is very desirable in the case of motor protective devices, since it reduces the temperature overshoot that might otherwise be experienced, particularly during switch on and off cycling action.

It will be understood that usually the switch will be mounted in close heat-exchange relationship with regard to the motor windings, as for example, within or on them. This is feasible, since the actual size of the switch such as illustrated may be on the order of 1" to 1½" long, ¼" to ½" wide and 3/16" to 3/8" thick. This may be described as a capsule adapted for easy insertion among motor windings and the like. Application of heat from the ambiently heating windings will transfer rapidly to the casing 1 and thence to strip 7 and then more slowly to strip 9, with a result similar to that described in reference to current-induced heating. Therefore, the switch is also applicable to controlling the circuit of, say, a cooking utensil where tripping is not intended to be in response to overload currents but simply in response to temperature rise from whatever cause may be associated with cooking. In this case the higher rates of heat application will bring about faster contact separations.

In FIG. 5 is shown a modification of the form of the invention shown in FIGS. 1–4. Corresponding reference numerals designate corresponding parts. In this modification the strip 9 is provided with an extension 33 adapted after some movement of the strip 9 to engage an insulating stop 35. The engagement may take place before or after contact 21 has separated from contact 23. The result is that cycling reclosure of the circuit after opening thereof will be slower than would occur with the construction shown in FIGS. 1–4. This is because contact 23, upon heating, is prevented from reaching a range of positions wherein, in the absence of the stop 35, it would more rapidly be reached upon return movement of the contact 21.

Referring to FIG. 6, there is shown a modification in which like numerals indicate like parts. In this form of the invention the casing 1 is again crimped at 3 and is sealed as at 5 to provide a container. Its other end is crimped as shown at 17' around insulation 15', which insulates both thermostatic strips 7' and 9' from one another and from the casing 1. The protruding portions 19' and 13' form terminals. The specifications for the materials of the strips 7' and 9' are the same as those for strips 7 and 9, described in connection with the forms of the invention shown in FIGS. 1–5. Thus the strip 7' has more resistance and is more active than the strip 9'. The strips, as before, carry contacts 21 and 23. This form of the invention is effective primarily for circuit-opening action in response to excess current which differentially heats the strips 7' and 9', the former being heated the most in response to a given value of current.

This form of the device also trips open the circuit at a lower temperature in strip 7' when greater current is applied than when smaller overload current is applied. In the latter case, current heating of the strip 7' is less rapid, giving time for heat transfer to strip 9', which delays tripping until a higher temperature is reached. On the other hand, upon application of large overload current, the strip 7' heats rapidly and becomes rapidly activated to trip before substantial heat transfer can occur into the strip 9'. In this form of the invention, upon operation in response to application of temperature from the ambient atmosphere, tripping occurs at about the same temperature, regardless of how slowly or rapidly the temperature is increased. This is because strips 7' and 9' under these conditions become heated at more nearly the same rate.

In FIG. 7 is shown a modification of the FIG. 6 form of the invention, in which like numerals designate parts like those applied in FIG. 6. In this case, however, a strip 37 of electrical and heat-insulating material is located between the thermostatic strips 7' and 9'. This to some degree reduces the rate of heat transfer between strips 7' and 9', thus accentuating the reduction in temperature at which the circuit will open in response to heavy overload current. This strip 37 may also function mechanically as an equivalent to the stop 35 shown in FIG. 5, if made stiff enough.

All forms of the invention have in common the characteristic that one of the thermostatic strips (7 or 7') has higher electrical resistance and greater activity than the other strip (9 or 9'). This makes all forms of the device particularly useful for preventing large overswings in temperatures which may occur in response to large overload currents, as under locked rotor conditions in a motor protection circuit. The forms shown in FIGS. 1–5 are more useful than the forms of FIGS. 6 and 7 in response to ambiently operative temperature changes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostatic switch comprising a pair of composite thermostatic switch blades having adjacent free end portions provided with contacts, the other ends of the blades being anchored, the inside components of the blades such as are nearest one another having relatively high and low coefficients of thermal expansion respectively, the blade which has said inside component of relatively high coefficient of expansion having characteristics of greater electrical resistance and greater activity in response to temperature change than those of the other blade.

2. A thermostatic switch comprising an electrically conductive and heat-conductive metal casing, a pair of bimetallic thermostatic switch blades therein having adjacent free end portions provided with contacts, the other ends of the blades being adjacently located and anchored with respect to the casing, the inside components of the blades which are nearest and face one another having relatively high and low coefficients of thermal expansion respectively, the one blade which has said component of relatively high coefficient of expansion having characteristics of greater electrical resistance and greater activity in response to temperature change than those of the other blade and where anchored being electrically and heat-conductively connected with the casing, the other blade being insulated both electrically and thermally where it is anchored.

3. A thermostatic switch made according to claim 1, including stop means adapted to limit movement of said other blade in response to temperature increase.

4. A thermostatic switch made according to claim 3, wherein said stop means is constituted by heat-insulating means extending from the anchors of the blades toward the contacts and lying between the blades.

5. A thermostatic switch comprising a casing, a pair of bimetallic thermostatic switch blades therein having adjacent free end portions provided with contacts, the other ends of the blades being adjacently located and being both anchored and insulated with respect to one another and the casing and extending outward from their anchors to form outside terminals, the components of the blades which face one another having relatively high and low coefficients of thermal expansion respectively, the blade which has said component of relatively high coefficient of expansion having characteristics of greater electrical resistance and greater activity in response to temperature change than those of the other blade.

6. A thermostatic switch made according to claim 5, including heat-insulating means extending from the anchors of the blades toward the contacts and lying between the blades.

7. A thermostatic switch made according to claim 2, wherein said heat-conductive metal casing which surrounds the switch blades and is in electrical and heat-conductive connection with the blade of higher resistance and greater activity is of small tubular form adapted for convenient insertion among electrical windings.

8. A thermostatic swich comprising first and second extending bimetallic thermostatic switch blades having adjacent free end portions provided with contacts, the other ends of the blades being anchored, the first blade having characteristics of greater electrical resistance and greater activity in response to temperature change than those of the second blade, the first blade having a component of high coefficient of thermal expansion and the second blade having a component of low coefficient of thermal expansion which face one another, and means interposed between and extending along the blades adapted to inhibit heat transfer between the blades to maximize temperautre differences therebetween in response to resistance heating of the first blade for accelerated response to fast current rise.

9. A thermostatic switch according to claim 8, wherein said interposed means also constitutes a stop limiting motion of the second blade.

10. A thermostatic switch comprising a metallic capsule of elongate form for convenient insertion in electric windings and closed at both ends, first and second bimetallic thermostatic switch blades within the capsule having adjacent free end portions provided with contacts adjacent one closed end of the capsule, the other end of the first blade having a heat- and current-conductive metallic connection supporting it on the inside of the capsule toward the other end of the capsule, the other end of the second blade extending from said last-named end of the capsule through a current- and heat-insulating support, the inside components of the blades such as are nearest one another having relatively high and low coefficients of thermal expansion respectively, the component of high coefficient belonging to the first blade, said first blade having characteristics of greater electrical resistance and greater activity in response to temperature change than those of the second blade.

11. A thermostatic switch according to claim 10, wherein the end of the second blade includes an extension beyond the first blade and insulating stop means supported in the capsule under said extension adapted to limit the motion of the second blade.

References Cited in the file of this patent

UNITED STATES PATENTS

| | | |
|---|---|---|
| 1,492,844 | Hall | May 6, 1924 |
| 1,743,053 | Traver | Jan. 7, 1930 |
| 1,916,669 | Kuhn et al. | July 4, 1933 |
| 1,916,671 | Hanser et al. | July 4, 1933 |
| 2,140,147 | Vroom | Dec. 13, 1938 |
| 2,303,153 | Woodworth | Nov. 24, 1942 |
| 2,311,019 | Bayne | Feb. 16, 1943 |
| 2,320,811 | Cook | June 1, 1943 |
| 2,338,474 | Wilson | Jan. 4, 1944 |
| 2,698,368 | Lehr et al. | Dec. 28, 1954 |
| 2,913,563 | Schmall et al. | Nov. 17, 1959 |

FOREIGN PATENTS

| | | |
|---|---|---|
| 58,138 | Germany | Aug. 20, 1891 |
| 597,603 | France | Sept. 5, 1925 |
| 423,225 | Great Britain | Jan. 28, 1935 |
| 620,215 | Great Britain | Mar. 22, 1949 |